United States Patent [19]

Feistel

[11] 3,798,605

[45] Mar. 19, 1974

[54] CENTRALIZED VERIFICATION SYSTEM

[75] Inventor: Horst Feistel, Mount Kisco, N.Y.

[73] Assignee: International Business Machines Corporation, Armonk, N.Y.

[22] Filed: June 30, 1971

[21] Appl. No.: 158,183

[52] U.S. Cl. .............................................. 340/172.5
[51] Int. Cl. .............................................. H04q 5/00
[58] Field of Search .................... 340/172.5; 178/22

[56] References Cited

UNITED STATES PATENTS

| | | | |
|---|---|---|---|
| 3,457,550 | 7/1969 | Gibson | 178/22 X |
| 3,609,697 | 9/1971 | Blevins | 340/172.5 |

*Primary Examiner*—Raulfe B. Zache
*Attorney, Agent, or Firm*—Victor Siber

[57] ABSTRACT

This specification describes a multi-terminal data processing system having means and process for verifying the identity of subscribers to the system. Validity of a terminal request for communication with the data processing system are determined on the basis of a centralized verification system. Each subscriber to the system is identified by a unique key binary symbol pattern. The central data processing unit contains a listing of all valid keys for subscribers to the system.

Two embodiments of the centralized verification system are presented, a password system and a handshaking system. In the password system, all data or information originating at the terminal under use of the subscriber is enciphered in combination with the unique subscriber key. Upon proper deciphering of the key or password at the central processing unit and arriving at a match with one of the keys in the processor's listing, the subscriber may communicate with the processing system. In the handshaking system embodiment, the user and the central processor exchange a plurality of messages each formed by a combination of new and prior received data. Received data messages are also maintained within the registers at both the terminal and the central processor for further verification upon the return of the portion of the message that was previously transmitted.

6 Claims, 9 Drawing Figures

INVENTOR
HORST FEISTEL

BY [signature]
ATTORNEY

CENTRALIZED VERIFICATION SYSTEM

CROSS-REFERENCE TO RELATED APPLICATIONS

Reference is hereby made to application Ser. No. 158,360, of H. Feistel, filed concurrently with the instant Application and entitled BLOCK CIPHER CRYPTOGRAPHIC SYSTEM and to application Ser. No. 158,174, of H. Feistel, filed concurrently with the instant Application and entitled STEP CODE CIPHERING SYSTEM.

BACKGROUND OF THE INVENTION

With the growing use of remote-access computers managing "data banks" to receive, store, process and furnish information of a confidential nature, the question of security has come to be of increasing concern. Data security has come to be one of the major concerns of the business community, especially in view of the fact that there is an increasing reliance on the automated data processing of all business information, both within and without the physical plant itself. Thus, large computing centers have available within their files various types of sensitive information ranging from business strategies to technological trade secrets and other useful data which should be maintained private for the exception of a restricted number of subscribers.

In the development of large data processing systems, attempts have been made in the prior art to protect the systems from unauthorized access. However, all of the prior attempts to solve the privacy or secrecy problem have only offered partial solutions. One approach taken in the prior art is to associate with stored segments of data or information a unique combination of binary digits usually referred to as a protection key. Then, whenever this block of data is accessed by a compute instruction it must have a similar protection key in order to execute the operation, and upon a mismatch some check interrupt is recorded. This technique has been incorporated both internal to the central computer operations and within input/output devices of the data store type. An example of this technique is described in U. S. Pat. No. 3,377,624 issued Apr. 9, 1968, and also in U. S. Pat. No. 3,368,207 issued Feb. 6, 1968.

Another approach to data security is presented in U. S. Pat. No. 3,245,045, issued Apr. 5, 1966, which pertains to a multi-terminal data processing system. In that system, various local terminals are restricted to request information which only pertains to the particular physical location of the department where the terminal is situated. Thus, the terminals in the Payroll department may only request payroll information and similar restrictions would be present for other terminals on the system. The means for preventing unauthorized terminal usage is a simple logic circuit which makes a comparison as to the physical location of the terminal and the transaction it wishes to execute. This technique offers only a minimal protection in that an unscrupulous individual can very quickly learn the proper address code which must be presented to the system to gain any information which he wants. This is especially so if it is assumed that the unauthorized user has knowledge of the physical circuitry within the system.

Due to the unsuccessful attempts in the prior art to obtain complete security within a data processing environment by automatic means, resort has been made to physical security systems which limit the physical presence of individuals at various points within the data processing network by identifying some physical characteristic of the person such as fingerprints or facial appearance. This type of approach may in some instances prove to be successful but have associated therewith a high cost factor.

Another security system technique which has been employed in the prior art is the use of mechanically operated locks such as discussed in U. S. Pat. No. 3,508,205 issued Apr. 21, 1970. This system provides some digital symbol key which must be matched with the digital symbols generated upon actuation of the mechanical lock. This approach suffers from the same deficiencies as the memory protection devices in that they are also highly susceptible to "cracking" by unscrupulous individuals who desire to illegally appropriate proprietary information from the data processing system.

OBJECTS OF THE INVENTION

Therefore, it is the object of this invention to provide a data processing security system that will prohibit unauthorized access to data stored within a data processing network.

It is a further object of the present invention to provide a centralized verification system to prohibit unauthorized access to a data processing system in an economical manner without really restricting processing time.

It is a further object of the present invention to prevent unauthorized access and maintain privacy of confidential information within a data processing system by a process that identifies all authorized subscribers, each in possession of a unique combination of key symbols, which key controls ciphering and deciphering operations of cryptographic devices within the data processing system.

It is another object of the present invention to provide a system for cryptographically enciphering a unique subscriber identifier code in combination with a continuously changing password, the resulting cipher being capable of identification by a central processing device.

It is another object of the present invention to provide a centralized verification system which maintains privacy between a terminal device and a central processing unit by encrypting all communications so as to form a block cipher of a unique password formed partially from the previous received transmission at both the terminal and the central processing unit.

SUMMARY

In accordance with this invention, a centralized verification system is provided which prevents unauthorized users from depositing, withdrawing or altering data stored within a terminal-oriented computer system.

In a first embodiment, a password method is utilized to identify subscribers of the system and make available to them all information to which they are authorized to have access. Every subscriber or user of the computer system has in his possession a unique key combination of binary symbols known only to himself and the computer's system to control the ciphering of all transmissions from the terminal by means of a block cipher cryptographic device. Initially, a block of binary digits consisting of a combination of data and a continuouly changing password is enciphered as a block by means of a cryptographic device. The resulting block cipher output of the cryptographic device is then transmitted across a channel to the central processing unit which receives the block cipher. Upon receipt of the ciphertext, an identical deciphering device, as units at the terminal, and operates under the control on the inverse of the subscriber binary key, deciphers the ciphertext into a clear message. If the communication is uncorrupted, then the transmitted data and password are retrieved. The receiving central processor performs a match of the continuously changing password to determine whether the subscriber is in fact authorized to continue communication with the data processing system.

In a second embodiment, a handshaking approach to communications between the terminal and the central processor is utilized to maintain privacy. In this system, as with the password system, the user or subscriber must first identify himself at the terminal to the central processing unit by name or some other non-enciphered representation. Upon receipt of this identifier, the central pprocessor selects the appropriate block key which will control the cryptographic device of the central processor which deciphers all subsequent received messages. Following the initial identification sequence, the subscriber enters a message at the terminal which is enciphered in accordance with his unique subscriber key $K_A$. At the receiving central processing station, a portion of the received message is stored until verification is complete, and the remaining second portion of the message is utilized in combination with other data obtained from the central processor to form a reply which is enciphered by the central processor with the same user key $K_A$. This reply message is then transmitted to the terminal.

Upon receiving the reply message, the terminal deciphers the reply which results in recovery of a selected portion of the received ciphertext which if properly deciphered corresponds with a portion of the first data transmission from the terminal to the central processor. If a comparison is successful at the terminal, a second transmission is sent from the terminal to the central processor again utilizing a portion of the received message as a part of this transmission. In a similar manner to operations at the terminal, the central processor also deciphers the received ciphertext and makes a comparison of a portion of the deciphered message with prior transmitted data that is retrieved by the terminal. Upon successful comparisons, both the central processor and the terminal user each determines that the other is in fact a valid communicator and authorized to receive further communications.

The foregoing objects, features and advantages of the invention will be apparent from the following more particular description of preferred embodiments of the invention, as illustrated in the accompanying drawing.

DETAILED DESCRIPTION OF THE INVENTION

In a data processing network having a plurality of terminals by which sometimes as many as several hundred subscribers communicate with a central processing unit (CPU), it should be expected that at some time an unscrupulous individual will attempt an appropriation of information or data to which he is not entitled. With this assumption in mind, it is further recognized that the opponent to the system will by some means gain certain knowledge of the system in order to perfect his deception. For example, it is highly probable that communications between terminal and central processors which travel over ordinary telephone communication lines are susceptible to tapping. Furthermore, it is assumed that the opponent also has complete knowledge of all structural components within the terminal device and within the central processor, since these devices are available on the open market by purchase. Not withstanding the fact that the above elements of the data processing network are known, the centralized verification system presented here provides privacy from unauthorized subscribers at a very low cost. In the simplest form, a verification system may be based on a sufficiently long block of randomly generated digits, known only to the two communicators, the sender and receiver, within the data processing system. Bearing in mind the discussion above, it should be apparent that in a hostile environment of even minimal sophistication, such a randomly generated password could be used only once, for a single transmission amounts to publication which would make the password available to anyone who might want to use it for dishonest purposes. Moreover, it should also be apparent that a password which is used in an isolated communication and is not interrelated with the data that is to be transmitted over the channel, is essentially useless in that anyone familiar with the general arrangement of the system could tamper with the data portion of the transmission while leaving the password in an unaltered form and thus illegally gain access to the central processor and all information stored within its data banks.

The verification system presented herein protects against forged password codes designed by a highly sophisticated intruder, and also protects against attempts to alter communications transmitted by authorized users of the system, including possible retransmission of prerecorded communications.

Figure 1:
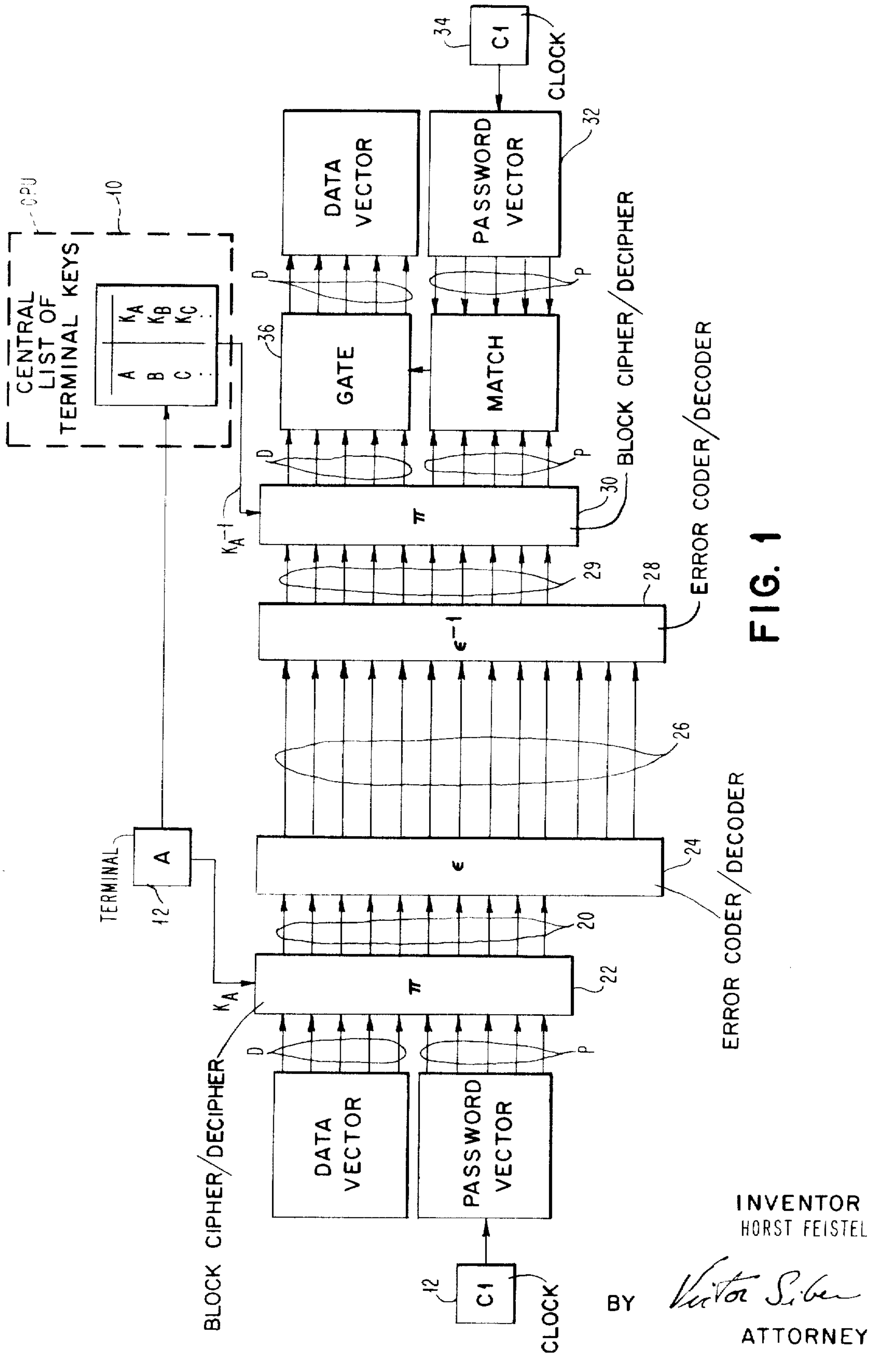
FIG. 1 is a block diagram representation of a centralized address identification and data verifcation system of the password type.

Referring now to FIG. 1 there is shown a password verification system block diagram. In this system, the initial communication between the terminal A and the central processing unit 10 consist of a simple request for service such as the presentation of the address of terminal A. For the purpose of simplicity and ease of understanding, all discussions herein will pertain to a single terminal communicating with a central processing unit. However, it should be recognized by those skilled in the art that the principles presented herein relate to a large data processing network consisting of possibly hundreds of terminals and more than one central processing unit as may be found in a large timesharing system. Terminal A may consist of any user input device to a computer network such as a typewriter, display, or other user device.

After recognition of the terminal A address by the CPU and after a channel of communication has been established between the terminal A and the central processing unit 10, the verification process begins as implemented by the system shown in FIG. 1. In this password embodiment, verification of the data is performed by posing a challenge to the terminal as to the validity of the random password. In this case, the CPU 10 simultaneously generates a prearranged password which is identical to the password generated at the terminal. This random password generation prevents an unauthorized user from prerecording a prior transmission and then attempting to gain access to the CPU 10 by a rebroadcast of the pre-recording. Since the random password is continuously changing, a retransmission would immediately identify an invalid communication.

An inexpensive way of generating the random password, is to utilize the central clock C1 within the central processing unit and within the terminal devices. This is a very practical implementation in that most data processing equipment contains at least one internal clock. The internal clock 12 presents a coded clock time which is continuously changing and has a different value for each new cipher block 20 that is transmitted.

Figure 3:
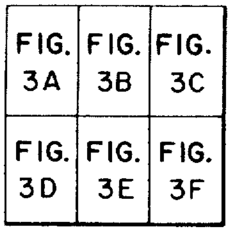
FIGS. 3, 3A, 3B, 3C, 3D, 3E and 3F is a detailed schematic diagram of one embodiment of a block cipher crytographic system which may be utilized in the centralized verification systems of FIGS. 1 and 2.
Figure 3A:
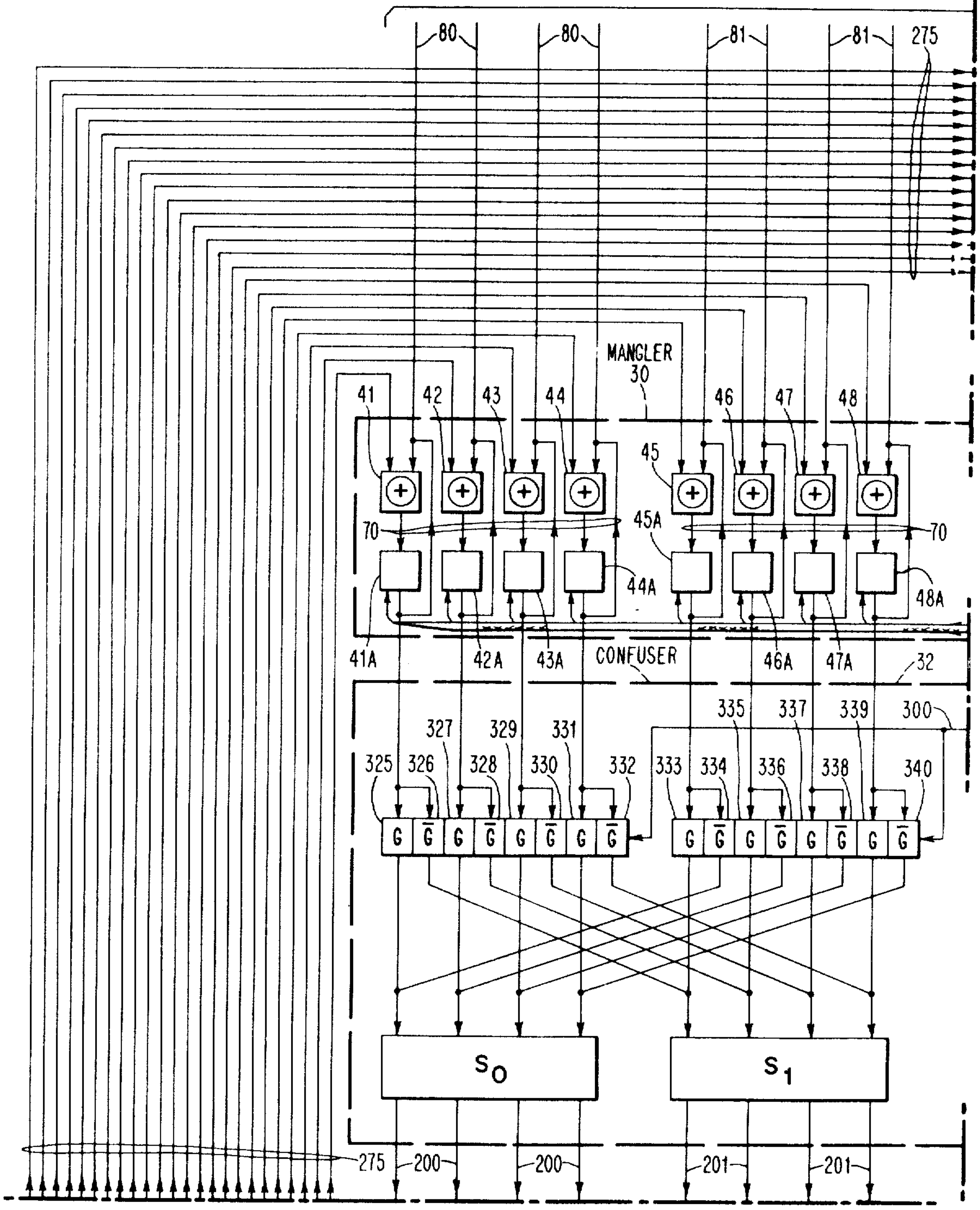
Figure 3B:
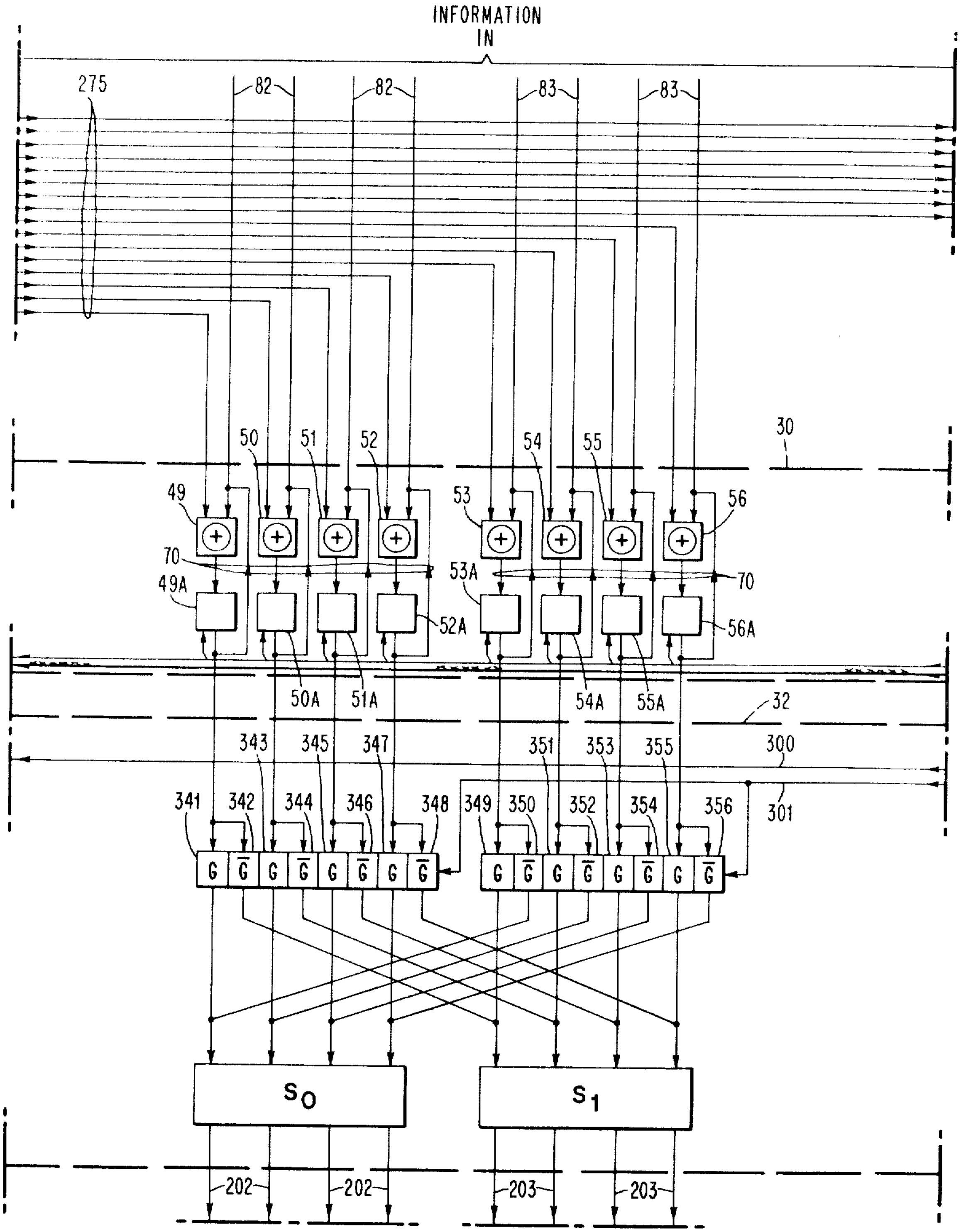
Figure 3C:
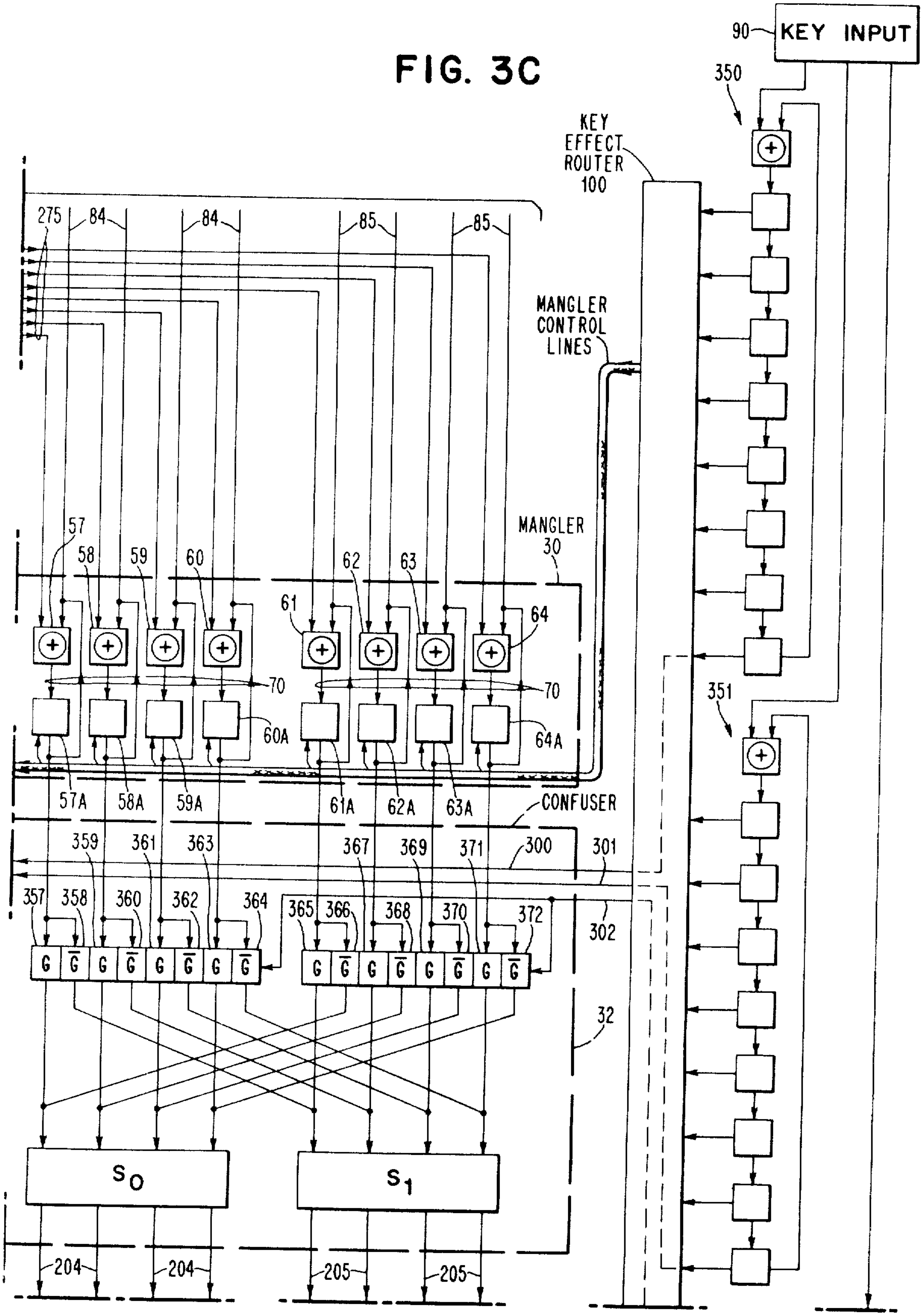
Figure 3D:
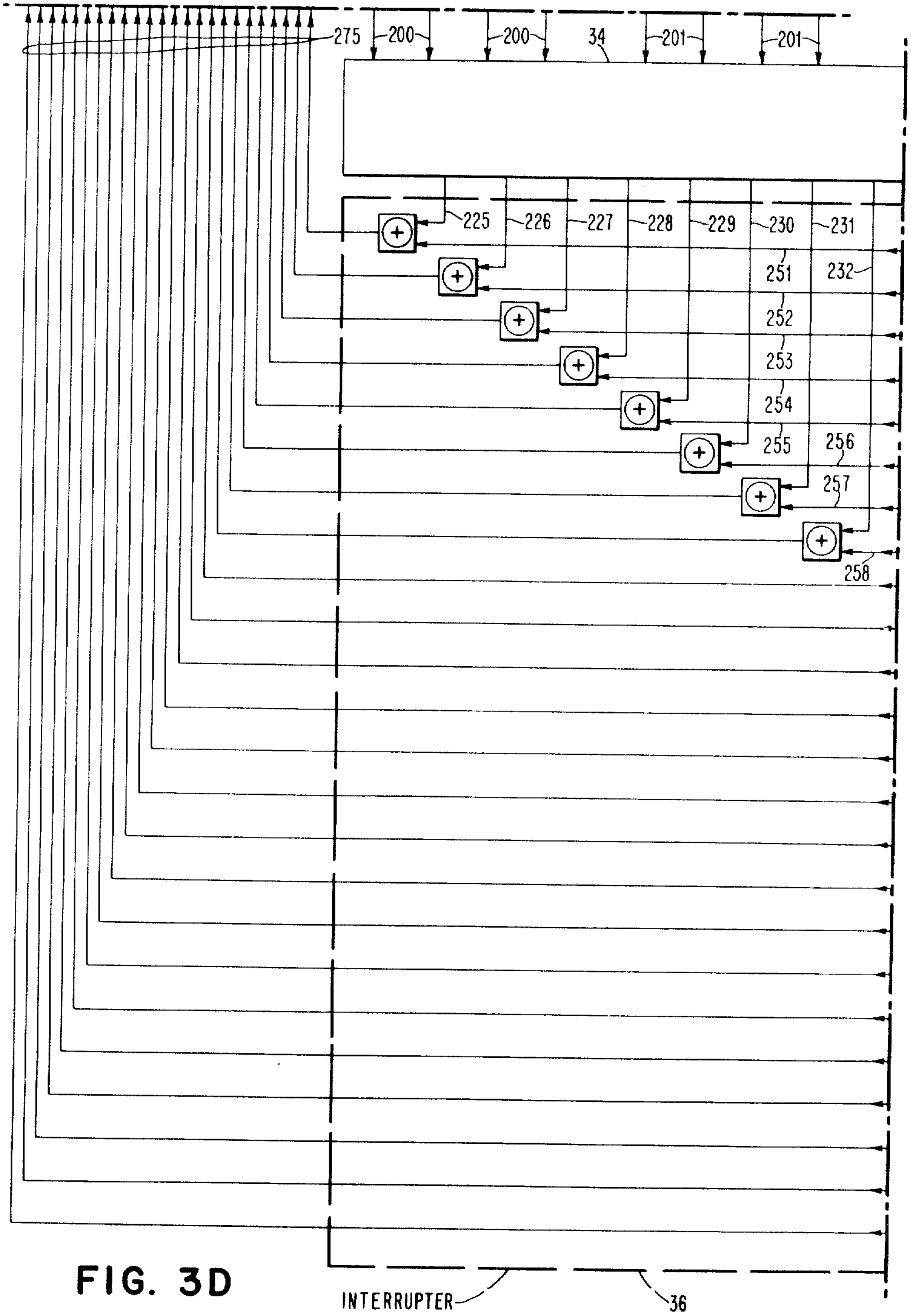
Figure 3E:
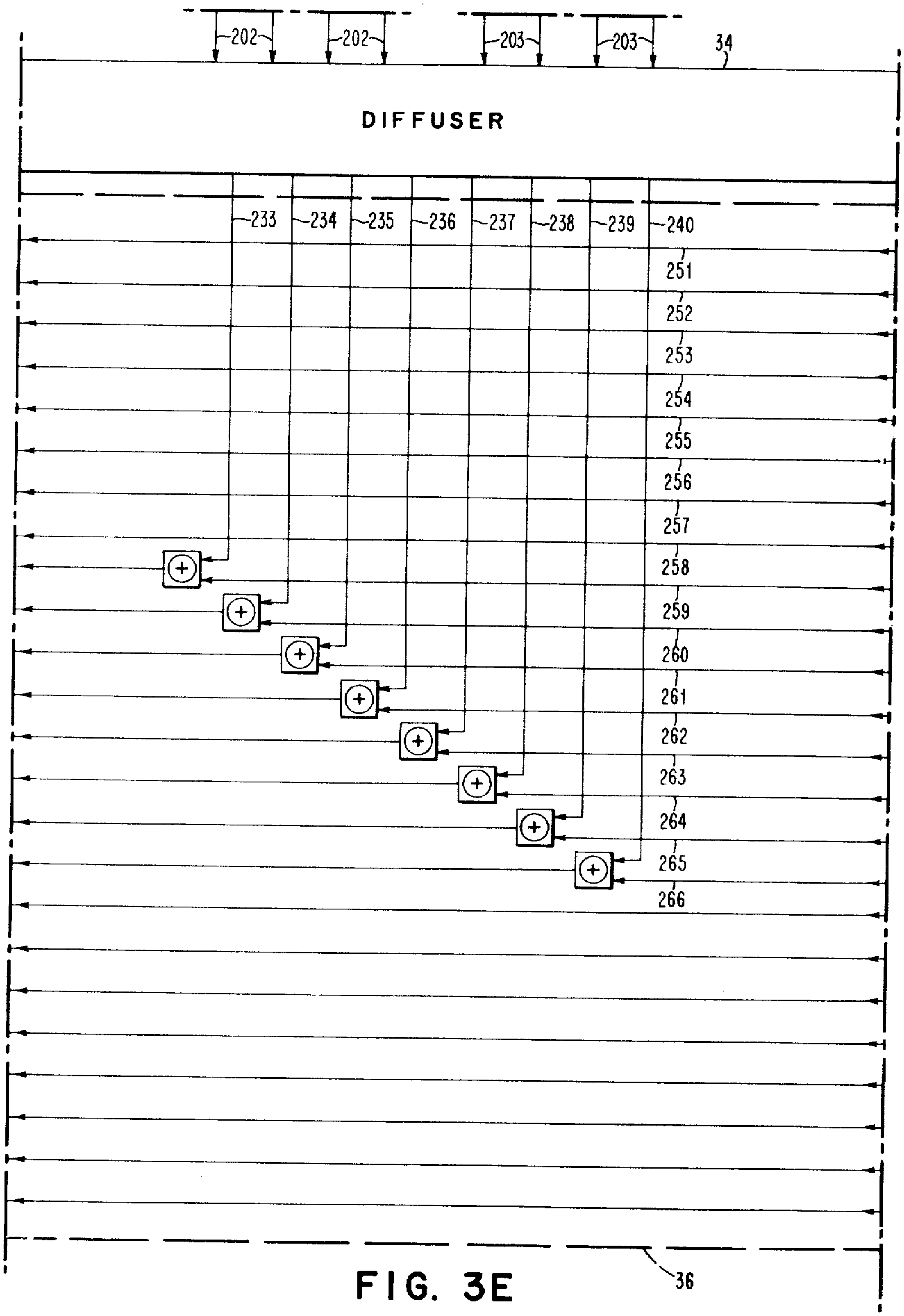
Figure 3F:
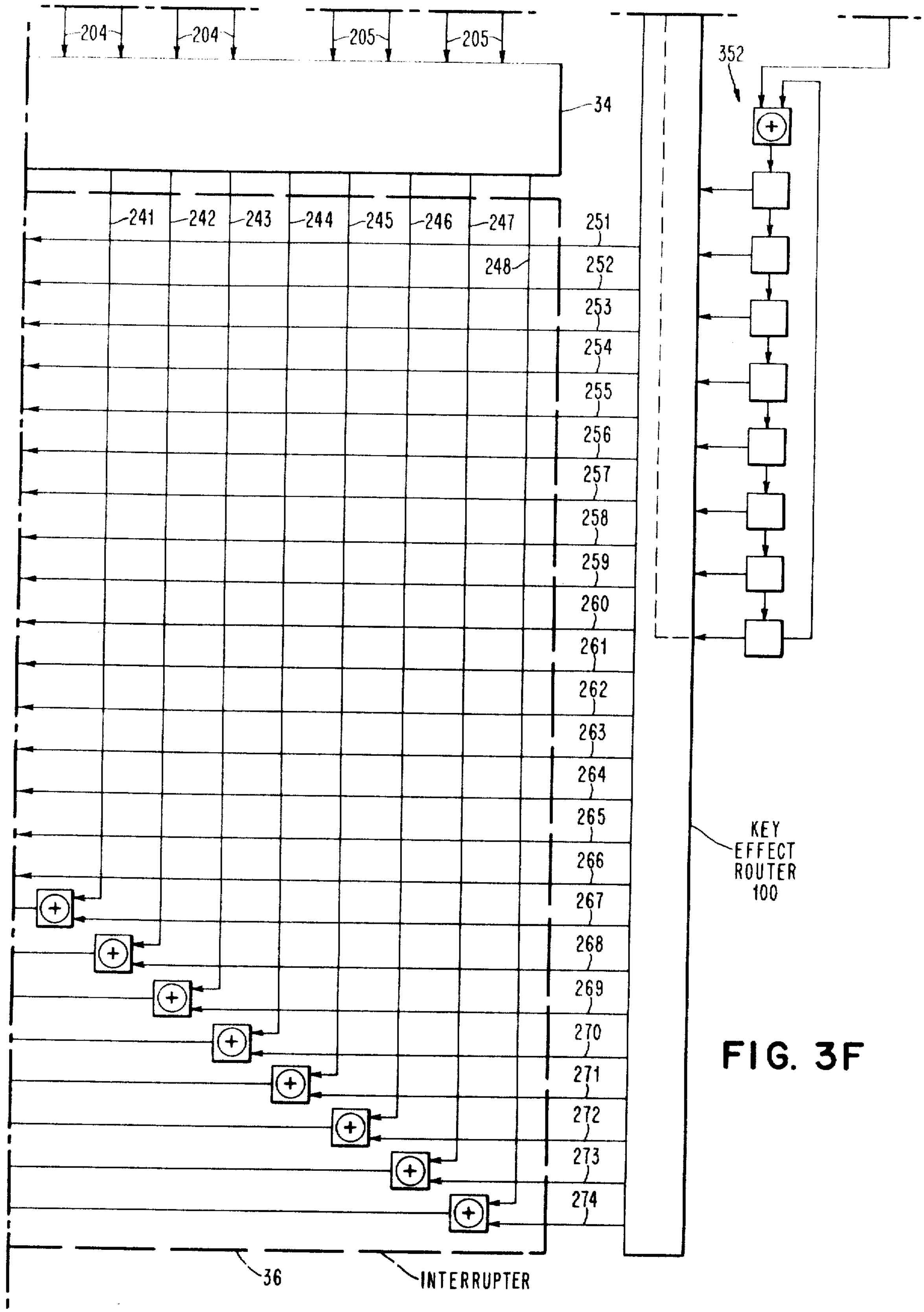

Assuming that identification of the terminal has been accomplished, and that the appropriate user key $K_A$ has been prepared at the CPU 10 for deciphering communications received, the user begins to communicate with the CPU 10 by presenting a data block D to the terminal A as an input. In conjunction with the data block D, the terminal adds a password P to form one complete block of data consisting of n binary digits of proper dimension for the cryptographic ciphering unit 22. This ciphering unit 22 herein after referred to as a $\pi$ cryptographic system is fully described in copending patent application Ser. No. 158,360 commonly assigned to the same assignee as the present invention. FIG. 3 shows a detailed schematic diagram representation of one possible embodiment of the $\pi$ cryptographic system 22 and will be fully described at a further point in this specification. At this point, it is sufficient to state that the $\pi$ cryptographic system develops a product cipher which is a function of the user key $K_A$. The block dimension of the product cipher is equal to the block dimension of the cleartext input to the $\pi$ cryptographic system 22. After encryption, the block cipher 20 is encoded by an errorcorrecting coding device 24 represented by the symbol $\epsilon$. Encoding device 24 may utilize any of the well known block error correcting codes which provides error detection and correction by some redundancy within the code generated. Several examples of such codes and devices for implementing the codes are disclosed in R. W. Lucky et al, "Principles of Data Communications," Chapter 11, McGraw Hill Book Co., 1968. The encoded data 26 is transmitted via a channel connecting the terminal to the CPU 10 which channel may be cable or any telecommunication line. Upon receiving the encoded block data 26, decoder 28 decodes the data block and provides a degree of error detection and correction to correct for natural interference which might be introduced in the channel. This eliminates the possibility of garbling valid message data because of some minor noise condition introduced in the channel. The degree of protection is a matter of design choice depending on the efficiency of the code used by the coder decoders 24 and 28.

The decoded output of decoder 28 appears as a ciphertext block which should be identical to the ciphertext output 20 of the $\pi$ cryptographic system. The cipher block is deciphered by means of $\pi$ cryptographic system 30 which operates under the subscriber key K executed in an inverse order $K_A-1$. The unique subscriber key is obtained from the key listing within the CPU 10. In the absence of severe interference in the transmission from terminal 12 to the CPU 10, the block cipher 29 will be deciphered correctly, thus revealing password P and data D which are as originally enciphered by the terminal 12. The password P which unfolds after decipherment by cryptographic system 30 is compared with an independently generated password 32 which is derived from CPU 10 internal clock 34. The internal clock 34 is a conventional clock ordinarily found in every central processing device. This clock is utilized to record on-the-air time so as to correctly charge customers for computing time services. It should be recognized by those skilled in the art, that while the internal clock timer is utilized in the preferred embodiment, any sequential counter within the terminal 12 or CPU 10 which presents a continually varying binary pattern could also be implemented to generate the password P. Password vector 32 is matched with the deciphered password P, and if a comparison is successful, gate 36 is energized to allow the data D to pass to the internal registers of the CPU.

It should be apparent to those skilled in the art, that for a given password P, *n* binary digits long, an opponent who guesses at the password P has a probability of $1/2^n$ to deceive the system by a correct guess. Generally, it is desirable to choose a block dimension as large as possible within the constraints of physical and cost limitation of the cryptographic system utilized. A recommended block size dimension which has yielded a reliable measure of privacy is a 128 bit block, with a password P approximately 64 bits in dimension.

Figure 2:
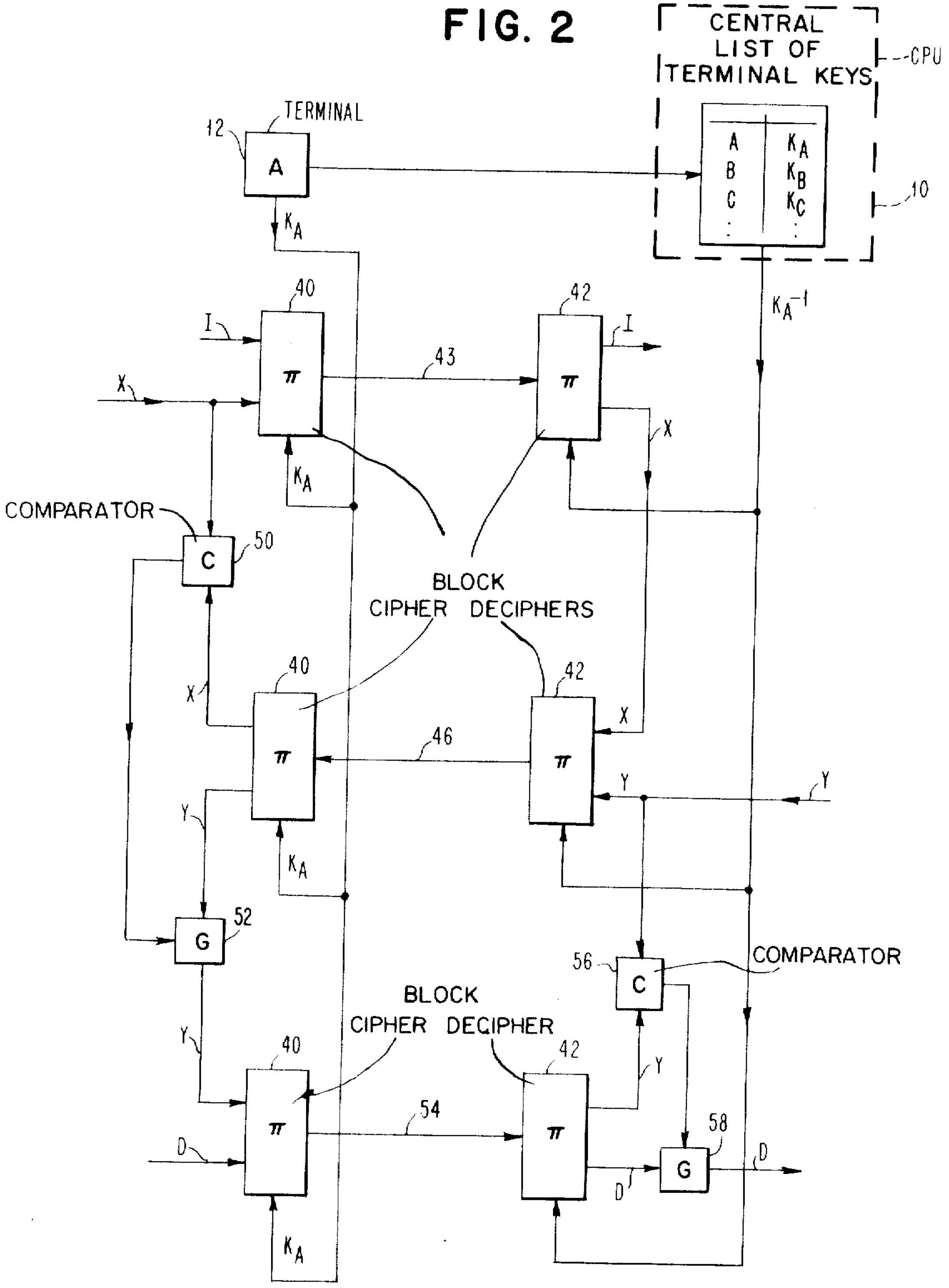
FIG. 2 is a block diagram representation of a centralized address identification and data verification system of the handshaking type.

Referring now to FIG. 2, there is shown an alternative embodiment for the centralized verification system. This embodiment shall be referred to herein as the handshaking system. As discussed with respect to the password embodiment of FIG. 1, the user or subscriber making utilization of terminal 12 must first identify himself to the CPU 10 so that the CPU 10 can locate and prepare the appropriate key $K_A$ for user A, so that the deciphering by the cryptographic system will be correct. Again, the cryptographic system used in the handshaking system is a block ciphering device such as the one disclosed in copending patent application Ser. No. 158,360, of which one embodiment is illustrated in FIG. 3 of this specification.

The terminal 12 also identified as terminal A has its own unique private key $K_A$ as provided by the subscriber A. Internal to the CPU 10, there is stored a listing of all subscribers known to the system and their unique subscriber key, Each key controls the particular rearrangement of information that is input to the cryptographic system so as to encipher the cleartext and develop a ciphertext output which is a function of the subscriber key.

For the purpose of illustration and to facilitate understanding of the invention, the system in FIG. 2 is described in terms of a series of communications between terminal 12 and the CPU 10. The terminal 12 selects a code I which is a series of binary bits that represent information to the processing system. This information I indicates that the particular subscriber A using the terminal 12 wishes to initiate a verified data transaction with the vault. In combination with the code group I, the terminal inserts a plurality of random digits X. These random digits X may be obtained in a similar manner as the password digits used in the password system of FIG. 1, or by means of a random number generator such as disclosed in U. S. Pat. No. 3,360,779, issued Jan. 30, 1968. Simultaneously with the insertion of random digits X into the input lines of the cryptographic system 40 which operates under the unique subscriber key $K_A$, the same X digits are stored in an internal register of the terminal (not shown). The stored digits are saved for further comparison and verification with binary digits received within a subsequent return communication from the CPU.

Binary code groups I and X are enciphered as a block by cryptographic system 40, resulting in a ciphertext transmitted as communication 43 which is not intelligible or capable of interpretation without knowledge of the subscriber key $K_A$.

Upon receipt of the ciphertext communication 43 at the CPU, the communication 43 is deciphered by cryptographic system 42 operating under the inverse subscriber key $K_A$−1. At this point in time, the CPU 10 has not yet completed verification of the communication. The deciphered text generated by cryptographic system 42 consists of the cleartext message inputed at the terminal 12 from bit groups I and X. The fact that the digit groups I and X are intelligible to the CPU, indicates to the CPU that the terminal user is indeed a legitimate member of the data bank community and must be in posession of subscriber key $K_A$ and should thus be capable of interpreting further communications which will be sent from the CPU 10 and enciphered by the key $K_A$. The digit X which has been deciphered, is now combined with a new digit group Y derived from CPU storage (not shown) and enciphered by cryptographic system 42 in accordance with subscriber key $K_A$. This ciphertext block is transmitted as communication 46 back to the terminal 12. Upon receipt at terminal 12, the ciphertext of communication 46 is deciphered by means of cryptographic system 40 from which the cleartext output should develop into digit group X and digit group Y. At this point in time, comparator 50 executes a comparison of the digit group X which was stored in the internal registers of the terminal (not shown) and the received digit group X which has made a complete cycle from terminal 12 to CPU 10 and back to terminal 12. If the comparison indicates that the digit groups X are equal, gate 52 is opened which indicates that in fact, the receiver of the communication is valid and further communications may be carried on. The activation of gate 52 permits the terminal user or subscriber A to present further data D to the CPU 10. This data D is combined with received digit group Y and is again enciphered as a block by cryptographic system 40. The generated cipher is transmitted by communication 54 which is received by the CPU 10 and deciphered by means of system 42. The resulting deciphered cleartext should in the absence of serious interference noise on the channel result in digit group Y and data group D. Similarly to the comparisons performed at the terminal 12, the CPU 10 also compares the received digit group Y with the digit group Y that was stored in its internal registers (not shown). This comparison is performed by comparator 56. If the comparison indicates an equality, gate 58 is opened thus permitting the data D to be routed to the specified locations in the CPU 10 where the D information is to be located.

In the description of the handshaking embodiment shown in FIG. 2, it was assumed that no transmission errors are encountered in communication between terminal 12 and CPU 10. However, it should be recognized by those skilled in the art that a block error detection and correction code system as utilized in the password embodiment is also applicable to the handshaking embodiment. Examples of such error detecting and correcting systems may be found in the R. W. Lucky et al, text cited above.

It should be recognized by those skilled in the art, that the series of verification communications described above may be implemented in all communications between terminal and CPU and need not be limited to three transmissions. Thus, it is possible to have continuous verification between terminal and CPU.

It should further be recognized by those skilled in the art, that for a data transaction involving many contiguous blocks of data, the handshaking operation described above need not be performed only once. The only requirement which has to be fulfilled is that each block be tied together with its neighboring blocks by a suitable redundancy structure anchored within the cipher block. One possible example is as follows:

$(D_3;D_2)S_A;(D_2;D_1)S_A;(D_1;P)S_A$, wherein the digits within the parenthesis are directly in alignment with each other to produce a cipher $S_A$ with a key $A$. Note, that each code contains a repetition of the data from its preceding neighbor.

A data transaction as shown in this example would involve a data train consisting of a lead-code and a data trailer. The CPU 10 then can continuously decipher and obtain the data trailers upon receipt. When the redundancy structure is no longer repeated, the CPU 10 determines the end of the data train. The CPU 10 also determines when a new data train begins by the appearance of a new lead-code. It is also possible to instead of using a portion of the received message as a return check symbol group, to use a unique password which is continuously changing similar to the password generated in the password system of FIG. 1. In this case the code train would then be arranged as follows:

$(D_3;D_2)S_A;(D_2;P)S_A;(D_1;P)S_A$ or
$(D_3;D_2)S_A;(D_2;D_1)S_A;(D_1;P)S_A$, where P is an ever changing password, different for each data train.

THE CRYPTOGRAPHIC SYSTEM

Referring now to FIGS. 3A–3F, there is shown a detailed schematic diagram of an embodiment of the $\pi$ cryptographic systems of FIGS. 1 and 2.

A data block D which is to be enciphered by the cryptographic system is loaded into the mangler 30 by means of information lines 80, 81, 82, 83, 84, 85 and 86. Each of these information lines are arranged in quadruplets which are associated with a quadruplet set of two bit shift registers 41–64. Each shift register consisting of upper storage elements 41–64 and lower storage elements 41*a*–64*a*. The binary data which is stored in each of the upper and lower elements of the shift register sub-sections, which form the message D, may be shifted up or down in each of the two bit shift register sections dependent on the binary values that appear on the mangler control lines emanating from the key effect router 100 to the mangler 30.

During the first round of the cryptographic system, the mangler 30 performs no initial operation on the message data D. The lower 24 bits within the storage elements 41$a$–64$a$ are loaded into a plurality of gates G and $\overline{G}$, each pair of gates receiving one output from the mangler 30. For example, gates 325 and 326 receive the output line from lower storage element 41$a$. The quadruplet of shift registers which receive the quadruplet of information n lines have associated therewith a set of four pairs of gates G and $\overline{G}$, each gate being activated by one of the control lines 300, 301 and 302. Depending on the binary signal values on the control lines 300, 301 and 302 either the gate G or $\overline{G}$ will be activated for controlling the passage of information to a particular substitution unit $S_0$ or $S_1$. Each substitution unit consists of a decoder and encoder section with a random interconnection of wires between the output of the decoder and the input of the encoder, as shown in FIGS. 5A and 5B of application Ser. No. 158,360. By this simple device, it is possible to develop one out of $2^n!$ possible permutations for $n$ input lines. The substitution as carried out by the $S_0$ and $S_1$ units effects a nonlinear transformation of the output of mangler 30.

Following the substitution, the outputs of the $S_0$ and $S_1$ units which are arranged in quadruplets 200, 201, 202, 203, 204, 205 and 206 are fed into diffuser 34 which carries out a linear transformation of the binary signal levels at the input and re-arranges the pattern of 1's and 0's depending on the interconnection of wires between the input and output of the diffuser 34. The outputs of diffuser 34 which appear on output lines 225–248 are fed into a plurality of mod-2 adders which carry out an exclusive OR between the output lines of diffuser 34 and the binary values derived from the key effect router 100 and appearing on lines 251–274. Each mod-2 output, is then fed back along lines 275 to be re-introduced into the mod-2 adders in the upper storage elements 41–64 of mangler 30. At this point in time, mangler 30 effects a plurality of shifts within each of the two bit shift register sections depending on the binary signal values routed from the effect router 100 by means of the mangler control lines.

Following the mangling operation by mangler 30 the $\pi$ cryptographic system is said to have completed a first round of encryption. For subsequent rounds, each of the cyclic key subgroup registers 350, 351 and 352 is shifted one bit position. Thus, at the end of eight rounds of encryption, the data in each of the subgroup key registers 350, 351, and 352 is identical to that which appeared in the registers at the beginning of the encipherment process. While this embodiment has been described with reference to a cryptographic system that executes eight rounds, it should be recognized by those skilled in the art, that it is possible to operate the cryptographic device for more or less rounds and thereby achieve various complexities or rearrangement of information thus controlling the probability of cracking the cipher.

What is claimed is:

1. In a data processing network having a plurality of terminals and a central processing unit, a centralized verification system comprising:

store means for holding a list of terminal subscriber keys, each key associated with a single subscriber to said network and consisting of a block of $n$ binary digits arranged in a unique combination;

means for presenting a first subgroup of binary digits representing a data vector;

means for generating a second subgroup of binary digits representing a password to be recognized at a receiver station in said network in order to gain admittance for carrying out further communications;

first cryptographic means for accepting in combination said first and second subgroups of binary digits and generating a block cipher under the control of a subscriber key;

means for presenting a combination of binary digits associated with a subscriber key to said cryptographic means for controlling the generation of said block cipher;

second cryptographic means for deciphering said block cipher under the control of an identical subscriber key obtained from said store means;

means for testing the output of said second cryptographic means for identifying a subgroup of the deciphered cleartext as consisting of a password;

gate means for permitting the flow of the subgroup data when said means for testing finds the correct password.

2. The system as defined in claim 1 wherein said means for generating said password comprises means for generating a sequentially changing combination of binary digits of dimension less than the block size input of said first cryptographic means.

3. The system as defined in claim 2 further comprising encoder block error detection and correction encoding means connected to said first cryptographic means for encoding all block ciphers prior to transmission;

decoder error detection and correction means connected to said second cryptographic means for decoding received block ciphers and correcting errors caused by interference in the transmission channel.

4. In a computer network having a plurality of terminal devices used by subscribers to said network to communicate with a central processing unit and its associated data banks, a method of centralized verification for recognizing authorized subscribers, said method comprising the steps of:

establishing a preliminary identification between a terminal and the central processing unit;

preparing a user key associated with the subscriber operating the terminal and making said key available to identical cryptographic devices at both the terminal and the central processing unit;

forming a composite message from a plurality of code groups comprising data and password information;

enciphering said composite message and forming a block cipher to be transmitted to a receiver station;

accepting said transmitted cipher at said receiver station and deciphering the received message into cleartext representing the composite message;

forming a reply message from a plurality of code groups, one of said code groups being a portion of the received message;

enciphering said second composite message and transmitting it to the terminal station;

deciphering said received second cipher text into a clear-text representative of said second composite message;

comparing a portion of the deciphered message with that portion of the first message which was returned by said receiver station;

preparing further transmission if said comparison indicates a correct code.

5. The process as defined in claim 4 further comprising the steps of:

storing a portion of every received message at both the terminals and the central processing unit for further comparison with subsequently received messages;

combining all code group messages with a portion of prior received communications to form composite messages at both said terminal and said central processing unit.

6. The method as defined in claim 4 further comprising the steps of:

encoding all block ciphers prior to transmission in accordance with an error detection and correction code;

decoding received block ciphers and correcting errors in accordance with said error detection and correction code.

* * * * *